(12) United States Patent
Kimura et al.

(10) Patent No.: US 7,950,848 B2
(45) Date of Patent: May 31, 2011

(54) SHEATH TYPE MEASURING INSTRUMENT, BEARING AND ROTARY MACHINE

(75) Inventors: Saho Kimura, Tokyo (JP); Takashi Sugaya, Tokyo (JP); Manabu Kazaoka, Kobe (JP); Yuuya Hashiguchi, Kobe (JP)

(73) Assignees: Ebara Corporation, Tokyo (JP); Okazaki Manufacturing Company, Kobe (JP)

( * ) Notice: Subject to any disclaimer, the term of this patent is extended or adjusted under 35 U.S.C. 154(b) by 1253 days.

(21) Appl. No.: 11/311,426

(22) Filed: Dec. 20, 2005

(65) Prior Publication Data

US 2006/0185450 A1 Aug. 24, 2006

(30) Foreign Application Priority Data

Dec. 22, 2004 (JP) ................. 2004-371712

(51) Int. Cl.
*G01K 1/08* (2006.01)
*G01K 1/14* (2006.01)
*G01K 1/16* (2006.01)
*G01K 13/08* (2006.01)
*G01K 7/02* (2006.01)

(52) U.S. Cl. ........ 374/141; 374/100; 374/208; 374/144; 374/163; 374/179

(58) Field of Classification Search ................. 374/141, 374/144, 153, 163, 179, 183, 185, 208, 142, 374/143, 152, 187, 198, 195, 100; 73/866.5, 73/593
See application file for complete search history.

(56) References Cited

U.S. PATENT DOCUMENTS

| | | | | | |
|---|---|---|---|---|---|
| 2,681,565 | A | * | 6/1954 | Kelk | 73/862.49 |
| 3,450,056 | A | * | 6/1969 | Stark et al. | 417/360 |
| 3,507,577 | A | * | 4/1970 | Swearingen | 417/53 |
| 3,516,873 | A | * | 6/1970 | Bonkowski et al. | 136/221 |
| 3,804,552 | A | * | 4/1974 | Covington | 416/134 R |
| 4,132,114 | A | * | 1/1979 | Shah et al. | 374/179 |
| 4,181,397 | A | * | 1/1980 | Baker et al. | 385/78 |
| 4,241,603 | A | * | 12/1980 | Han et al. | 73/129 |
| 4,355,912 | A | * | 10/1982 | Haak | 374/208 |

(Continued)

FOREIGN PATENT DOCUMENTS

DE 2534655 A1 * 2/1977

(Continued)

OTHER PUBLICATIONS

Japanese Office Action dated Apr. 27, 2010, issued in corresponding Japanese Patent Application No. 2004-371712.

*Primary Examiner* — Gail Verbitsky
(74) *Attorney, Agent, or Firm* — Westerman, Hattori, Daniels & Adrian, LLP

(57) ABSTRACT

A sheath type measuring instrument can be mounted in place easily and smoothly without the need for boring holes in an outer wall and an inner wall with high positional accuracy and also for a complex process, even if a barrel is to be fixed to the outer wall while a tip end of a sheath is being inserted in a sheath insertion hole bored in an inner wall. The sheath type measuring instrument has a sheath having a tip end for being brought closely to or into contact with a measurand for measuring a physical property of the measurand, and a barrel holding a proximal portion of the sheath for movement in a direction perpendicular to an axis of the sheath.

3 Claims, 9 Drawing Sheets

U.S. PATENT DOCUMENTS

| | | | | |
|---|---|---|---|---|
| 4,734,994 A | * | 4/1988 | Cusack | 33/561 |
| 4,850,457 A | * | 7/1989 | Taig | 188/72.1 |
| 4,852,451 A | * | 8/1989 | Rogers | 86/33 |
| 4,889,483 A | * | 12/1989 | Gentry | 432/49 |
| 5,128,688 A | * | 7/1992 | West | 343/766 |
| 5,146,244 A | * | 9/1992 | Myhre et al. | 359/509 |
| 5,277,496 A | * | 1/1994 | Mayer et al. | 374/130 |
| 5,509,310 A | * | 4/1996 | El-Ibiary | 73/660 |
| 5,601,365 A | * | 2/1997 | Li | 374/121 |
| 5,632,557 A | * | 5/1997 | Simons | 374/148 |
| 5,639,108 A | * | 6/1997 | Challande et al. | 280/629 |
| 5,707,152 A | * | 1/1998 | Krywitsky | 374/208 |
| 5,862,890 A | * | 1/1999 | Long et al. | 188/71.5 |
| 6,094,904 A | * | 8/2000 | Goodrich et al. | 60/803 |
| 6,161,962 A | * | 12/2000 | French et al. | 384/459 |
| 6,193,414 B1 | * | 2/2001 | Balzano | 374/208 |
| 6,220,749 B1 | * | 4/2001 | Wyker | 374/141 |
| 7,080,940 B2 | * | 7/2006 | Gotthold et al. | 374/161 |
| 7,121,013 B2 | * | 10/2006 | Herkt et al. | 33/551 |
| 7,222,704 B2 | * | 5/2007 | Pearson et al. | 188/378 |
| 7,448,854 B2 | * | 11/2008 | Jolly et al. | 416/1 |
| 2004/0258130 A1 | * | 12/2004 | Gotthold et al. | 374/208 |

FOREIGN PATENT DOCUMENTS

| | | | |
|---|---|---|---|
| JP | 60-15637 U | | 2/1985 |
| JP | 02008721 A | * | 1/1990 |
| JP | 09304230 A | * | 11/1997 |
| JP | 10-9966 A1 | | 1/1998 |

* cited by examiner

SHEATH TYPE MEASURING INSTRUMENT, BEARING AND ROTARY MACHINE

BACKGROUND OF THE INVENTION

1. Technical Field of the Invention

The present invention relates to a sheath type measuring instrument for use in directly measuring a physical property of a measurand, which is covered with an outer wall such as a casing or the like and is disposed in an inner wall, such as the temperature of a thrust pad of a thrust bearing disposed in a casing, for example, a bearing incorporating such a sheath type measuring instrument for monitoring at all times the temperature of a member exposed to a high temperature, such as a thrust pad or the like, and a rotary machine having a rotatable shaft (main shaft) rotatably supported by such a bearing.

2. Description of the Related Art

Rotary machines such as pump apparatus or the like, for example, have a rotatable shaft (main shaft), which rotates at a high speed, rotatably supported by bearings. The bearings include a radial bearing for bearing radial loads and a thrust bearing for bearing a thrust load. The thrust bearing generally has a thrust pad or the like which is held in sliding contact with a rotor and hence generates heat. It has been desirous to monitor at all times the temperature of a member exposed to a high temperature, such as a thrust pad or the like, and to hold the temperature at or below a predetermined temperature.

It has been practiced to directly measure the temperature of above-described thrust pad or the like with a sheath type measuring instrument which has a thermocouple or a thermoresistor housed in a sheath (metallic protective tube) and an insulation such as of magnesia or the like filled between the thermocouple or the thermoresistor and the sheath, the sheath being of a reduced outside diameter. When the sheath type measuring instrument is used to measure the temperature of members such as thrust pads or the like which are relatively narrow and are closely disposed, there is less danger of disconnection than if a thermocouple or a thermoresistor is directly wired to thrust pads or the like.

Heretofore, as shown in FIG. 7, a sheath type measuring instrument 10 has a thin linear sheath (metallic protective tube) 12 housing a thermocouple or a thermoresistor in its distal end and filled with an insulation, and a barrel 14 for fixing the sheath 12 while positioning in position. The sheath 12 has a proximal portion telescopically held in the barrel 14 by a spring or the like. For directly measuring the temperature of a measurand 22 having a heat generating region 20, disposed in an outer wall 16 such as an outer casing or the like and covered with an inner wall 18 such as an inner casing or the like, using the sheath type measuring instrument 10, a barrel mount hole 24 for mounting the barrel is bored in the outer wall 16 and a sheath insertion hole 26 for inserting the tip end of the sheath 12 therein is bored in the inner wall 18 and the measurand 22 in alignment with the barrel mount hole 24. With the tip end of the sheath 12 being located in position in the sheath insertion hole 26, an externally threaded tapered surface 14a on the lower outer circumference of the barrel 14 of the sheath type measuring instrument 10 is threaded into the barrel mount hole 24 in the outer wall 16, thereby fastening the barrel 14 to the outer wall 16 to hold the sheath 12 in position.

According to another scheme, as shown in FIG. 8, a clearance hole 27 having a larger inside diameter than the diameter of the sheath 12 is bored in the outer wall 16, and the barrel 14 of the sheath type measuring instrument 10 is mounted on the outer wall 16 with a flange 28 that is large enough to close the clearance hole 27. The flange 28 attached to the outer wall 16 is positionally adjusted to absorb a positional deviation $\delta_1$ between the center $O_1$ of the clearance hole 27 and the center $O_2$ of the sheath insertion hole 26 by bringing the axis of the barrel 14 and the sheath 12 into alignment with the center $O_2$ of the sheath insertion hole 26.

For measuring the temperature of a measurand with the sheath type measuring instrument, if the sheath insertion hole for inserting the tip end of the sheath therein is of an inside diameter that is much greater than the diameter of the sheath, for example, then the temperature cannot accurately be measured because of a heat gradient within the sheath insertion hole. Therefore, the inside diameter of the sheath insertion hole is required to be of substantially the same as the diameter of the sheath.

If the sheath insertion hole is a hole (narrow hole) having substantially the same inside diameter as the diameter of the sheath, then as shown in FIG. 7 referred to above, for example, when the sheath 12 is to be located in position to install the sheath type measuring instrument 10 after boring the barrel mount hole 24 in the outer wall 16 and boring the sheath insertion hole 26 in the inner wall 18 and the measurand 26, the barrel mount hole 24 and the sheath insertion hole 26 need to be highly positionally accurate with respect to each other. Therefore, it may be necessary to take into account a case where the barrel mount hole 24 and the sheath insertion hole 26 are to be machined after the parts are assembled. Specifically, as shown in FIG. 9, in the event that a positional deviation $\delta_2$ occurs between the center $O_3$ of the barrel mount hole 24 and the center $O_4$ of the sheath insertion hole 26, even if the positional deviation $\delta_2$ is slight, since the axis of the barrel 14 and the sheath 12 is aligned with the center $O_3$ of the barrel mount hole 24, the sheath 12 interferes with the open end of the sheath insertion hole 26. Therefore, the sheath 12 cannot smoothly be inserted into the sheath insertion hole 26. If the sheath 12 is forcibly inserted, it may be deformed or damaged.

If, as shown in FIG. 8, the positional deviation $\delta_1$ between the clearance hole 27 bored in the outer wall 16 and the sheath insertion hole 26 bored in the inner wall 18 and the measurand 22 is to be absorbed by the flange 28, then a complex process is required to move the flange 28 to a position where the tip end of the sheath 12 can be inserted into the sheath insertion hole 26 and to position and fix the flange 28, for example.

SUMMARY OF THE INVENTION

The present invention has been made in view of above drawbacks. It is an object of the present invention to provide a sheath type measuring instrument, a bearing with such a sheath type measuring instrument, and a rotary machine with such a bearing, which allow a barrel to be fixed to an outer wall easily and smoothly without the need for boring holes in the outer wall and an inner wall with high positional accuracy and also for a complex process, even if the barrel is to be fixed to the outer wall while the tip end of a sheath is being inserted in a sheath insertion hole bored in the inner wall.

In order to achieve the above object, a sheath type measuring instrument according to the present invention has a sheath having a tip end for being brought closely to or into contact with a measurand for measuring a physical property of the measurand, and a barrel holding a proximal portion of the sheath for movement in a direction perpendicular to an axis of the sheath.

With the above arrangement, even if there is a positional deviation occurring between a barrel mount hole bored in an outer wall and a sheath insertion hole bored in an inner wall, the sheath is translated in the direction perpendicular to the axis thereof by a distance that is commensurate with the positional deviation. Therefore, the positional deviation can be absorbed easily. The sheath type measuring instrument can be mounted in place with the tip end of the sheath being located in place in the sheath insertion hole.

According to the present invention, a bearing for being housed in a bearing casing has a sliding contact member for being held in sliding contact with a rotor and being heated, wherein the bearing has a sheath type measuring instrument including a sheath having a proximal portion held in a barrel for movement in a direction perpendicular to an axis of the sheath, the sheath having a tip end disposed in position in a sheath insertion hole defined in the bearing casing.

With the above arrangement, the temperature of a sliding member exposed to high temperatures, such as a thrust pad of a thrust bearing, for example, can be monitored at all times by the sheath type measuring instrument.

A rotary machine according to the present invention has a bearing housed in a bearing casing and having a sliding contact member for being held in sliding contact with a rotor and being heated, the bearing being disposed in an apparatus casing, and a sheath type measuring instrument having a sheath having a proximal portion held in a barrel for movement in a direction perpendicular to an axis of the sheath. The sheath type measuring instrument is fixed to the apparatus casing by the barrel, the sheath having a tip end disposed in position in a sheath insertion hole defined in the bearing casing.

With the above arrangement, a malfunction of the rotary machine such as a pump or the like can be found early by monitoring at all times the temperature of a sliding member of a bearing which is exposed to high temperatures.

DETAILED DESCRIPTION OF THE PREFERRED EMBODIMENT

An embodiment of the present invention will be described below with reference to the drawings.

Figure 1:
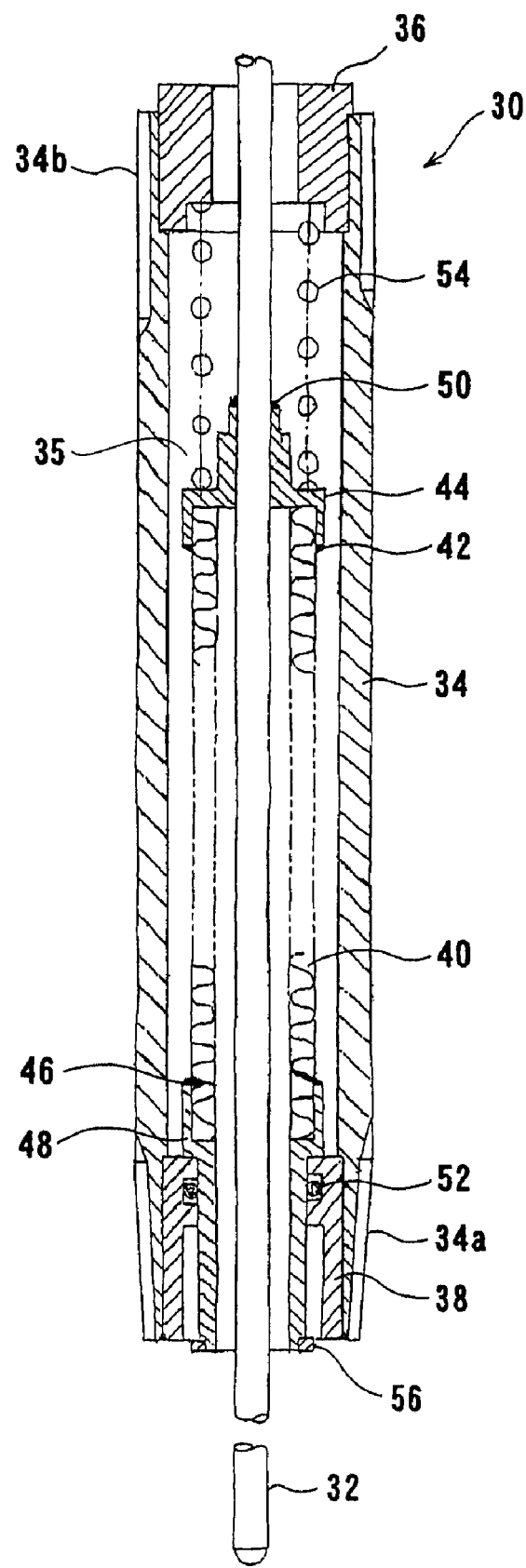
FIG. 1 is a cross-sectional view of a sheath type measuring instrument according to an embodiment of the present invention.

FIG. 1 shows a sheath type measuring instrument 30 according to an embodiment of the present invention. As shown in FIG. 1, this sheath type measuring instrument 30 has a thin linear sheath (metallic protective tube) 32 housing a thermocouple or a thermoresistor in its distal end and filled with an insulation, and a hollow cylindrical barrel 34 for fixing the sheath 32 while positioning in position. The barrel 34 has an externally threaded tapered surface 34a on a lower outer circumference thereof and an externally threaded surface 34b on an upper outer circumference thereof. A substantially cylindrical upper bushing 36 and a substantially cylindrical lower bushing 38 are fitted respectively in upper and lower inner circumferences of the barrel 34.

A flexible coupling 40 comprising bendable metallic bellows made of stainless steel or the like, for example, is disposed in the barrel 34 between the upper bushing 36 and the lower bushing 38. The flexible coupling 40 has an upper end (free end) welded to an upper socket 44 (a first socket) by a welded region 42 and a lower end (proximal end) welded to a lower socket 48 (a second socket) by a welded region 46. The upper socket 44 is welded to the sheath 32 by a welded region 50 while being free with respect to the barrel 34. The lower socket 48 is slidably fitted in the lower bushing 38 while being free with respect to the sheath 32. An O-ring 52 for keeping the interior of the barrel 34 hermetically closed is interposed between the lower socket 48 and the lower bushing 38.

Since the proximal end of the flexible coupling 40 is supported by the barrel 34 while being free with respect to the sheath 32, and the free end of the flexible coupling 40, which is free with respect to the barrel 34 within space 35, is fixed to the sheath 32, the sheath 32 can be translated in a direction perpendicular to the axial direction of the sheath 32 through the flexible coupling 40.

In this embodiment, a spring 54 is interposed between the upper socket 44 and the upper bushing 36. The sheath 32 can be extended from and contracted into the barrel 34 under the resiliency of the spring 54, i.e., the length of the tip end portion of the sheath 32, which extends from the barrel 34, can be adjusted. A stopper 56 is mounted on the lower end of the lower socket 48 for abutting against a smaller-diameter end face of the lower bushing 38 to prevent the lower bushing 38 from moving (being lifted) when the lower socket 48 is moved (lifted) relatively to the lower bushing 38.

Figure 2:
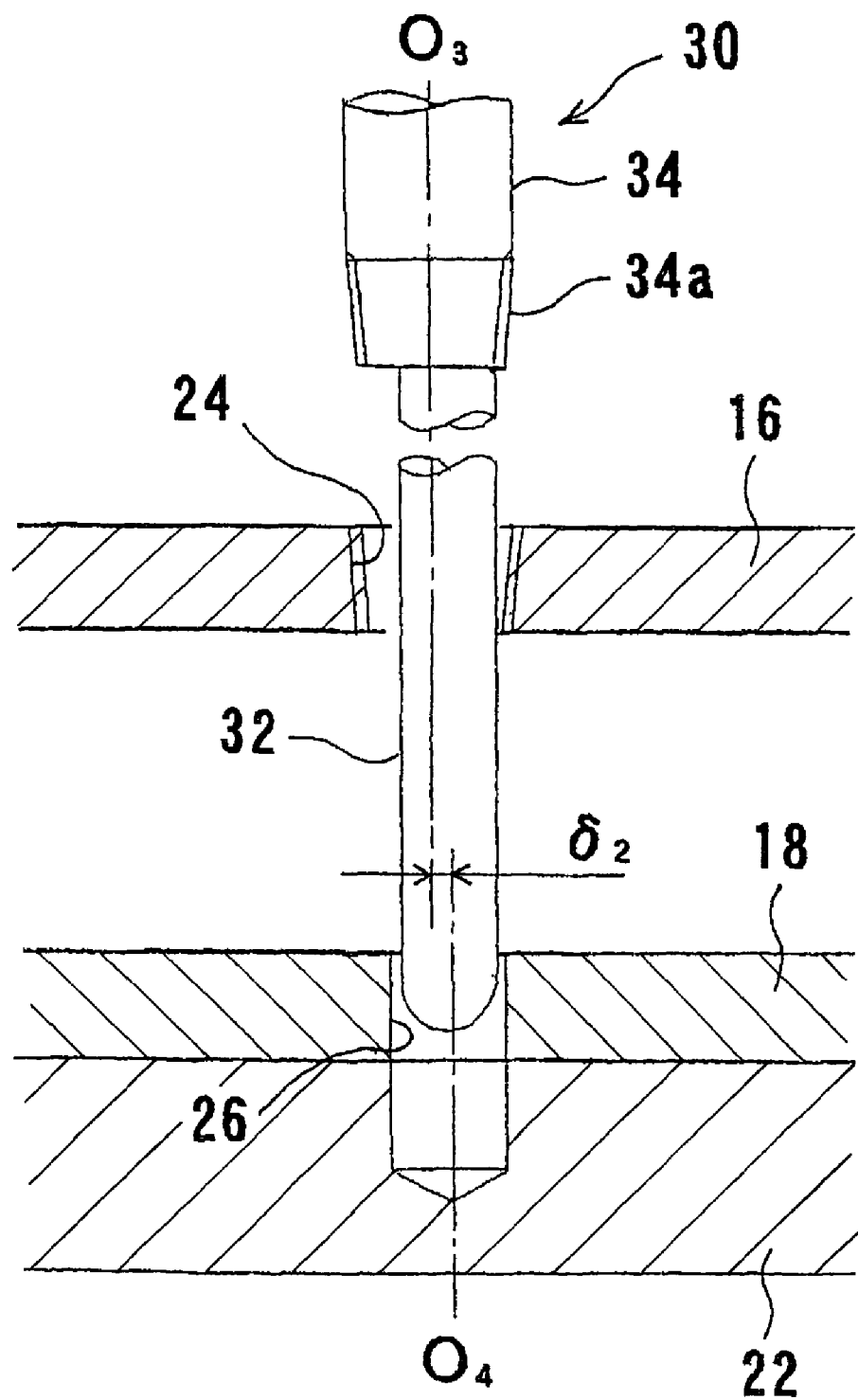
FIG. 2 is a view illustrative of the manner in which the sheath type measuring instrument shown in FIG. 1 is mounted in place.
Figure 9:
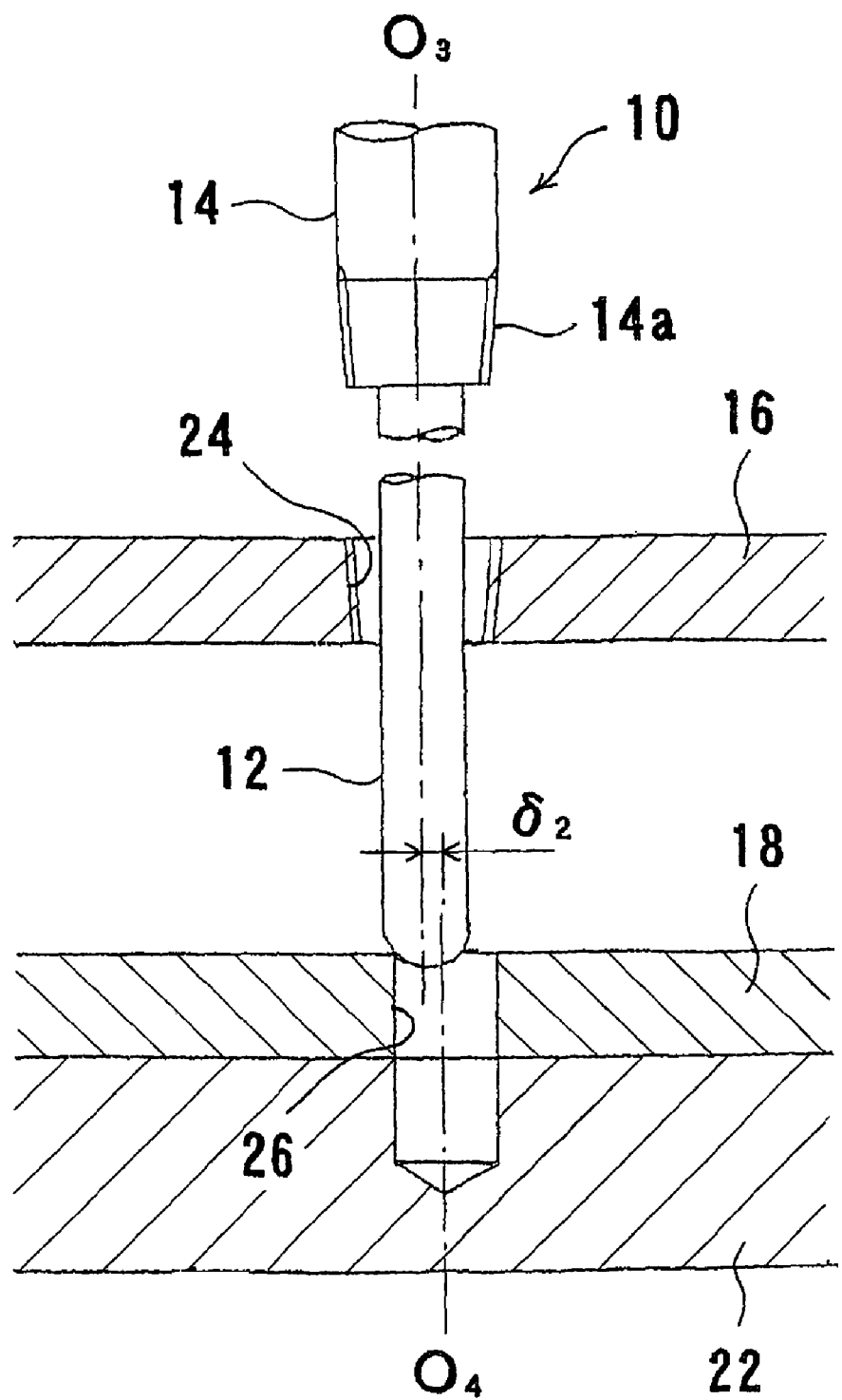
FIG. 9 is a view illustrative of a defect of the scheme illustrated in FIG. 7.

A process of mounting the sheath type measuring instrument 30 according to this embodiment by, as with the conventional sheath type measuring instrument shown in FIG. 9, boring the barrel mount hole 24 in the outer wall 16 and the sheath insertion hole 26 in the inner wall 18 and the measurand 22, and locating the tip end of the sheath 32 in position in the sheath insertion hole 26, will be described below with reference to FIG. 2. It is assumed that a positional deviation $\delta_2$ occurs between the center $O_3$ of the barrel mount hole 24 and the center $O_4$ of the sheath insertion hole 26.

The sheath 32 extending from the barrel 34 is kept parallel to the barrel 34 and translated in a direction perpendicular to the axis of the sheath 32 by a distance that is commensurate with the positional deviation $\delta_2$ between the barrel mount hole 24 and the sheath insertion hole 26 through the flexible coupling 40 housed in the barrel 34, thereby absorbing the positional deviation $\delta_2$ with the sheath type measuring instrument 30 itself. Specifically, while the axis of the barrel 34 is being held in alignment with the center $O_3$ of the barrel mount hole 24, the axis of the sheath 32 is brought into alignment with the center $O_4$ of the sheath insertion hole 26. Then, the tip end of the sheath 32 is located in position in the sheath insertion hole 26, and the externally threaded tapered surface 34a of the barrel 34 is threaded into the barrel mount hole 24 in the outer wall 16, thereby fixing the barrel 34 to the outer wall 16.

Even if there is a positional deviation occurring between the barrel mount hole 24 in the outer wall 16 and the sheath insertion hole 26 in the inner wall 18, the positional deviation can be absorbed easily with the sheath type measuring instrument 30 itself. Accordingly, even if the outer wall 16 and the inner wall 18 are bored without the need for high positional accuracy, the sheath type measuring instrument 30 can be mounted in place while the sheath 32 is being positioned in place. As there is no need for concern over a positional deviation of the holes when the parts are assembled, the assembling efficiency is increased and the time required to assemble the parts is greatly reduced.

Figure 3:
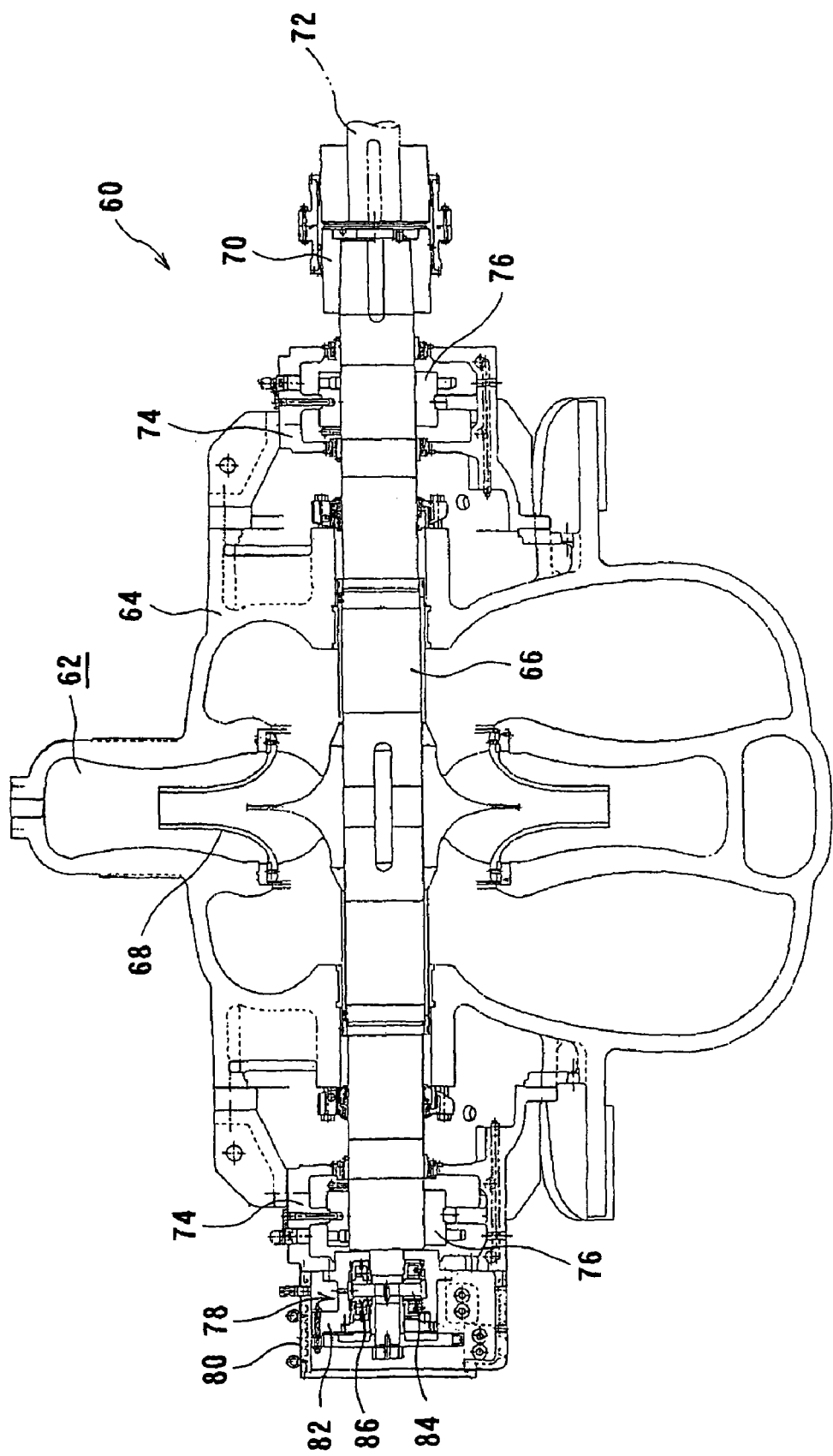
FIG. 3 is a cross-sectional view of a pump apparatus as a rotary machine in which sheath type measuring instruments shown in FIG. 1 are mounted.
Figure 4:
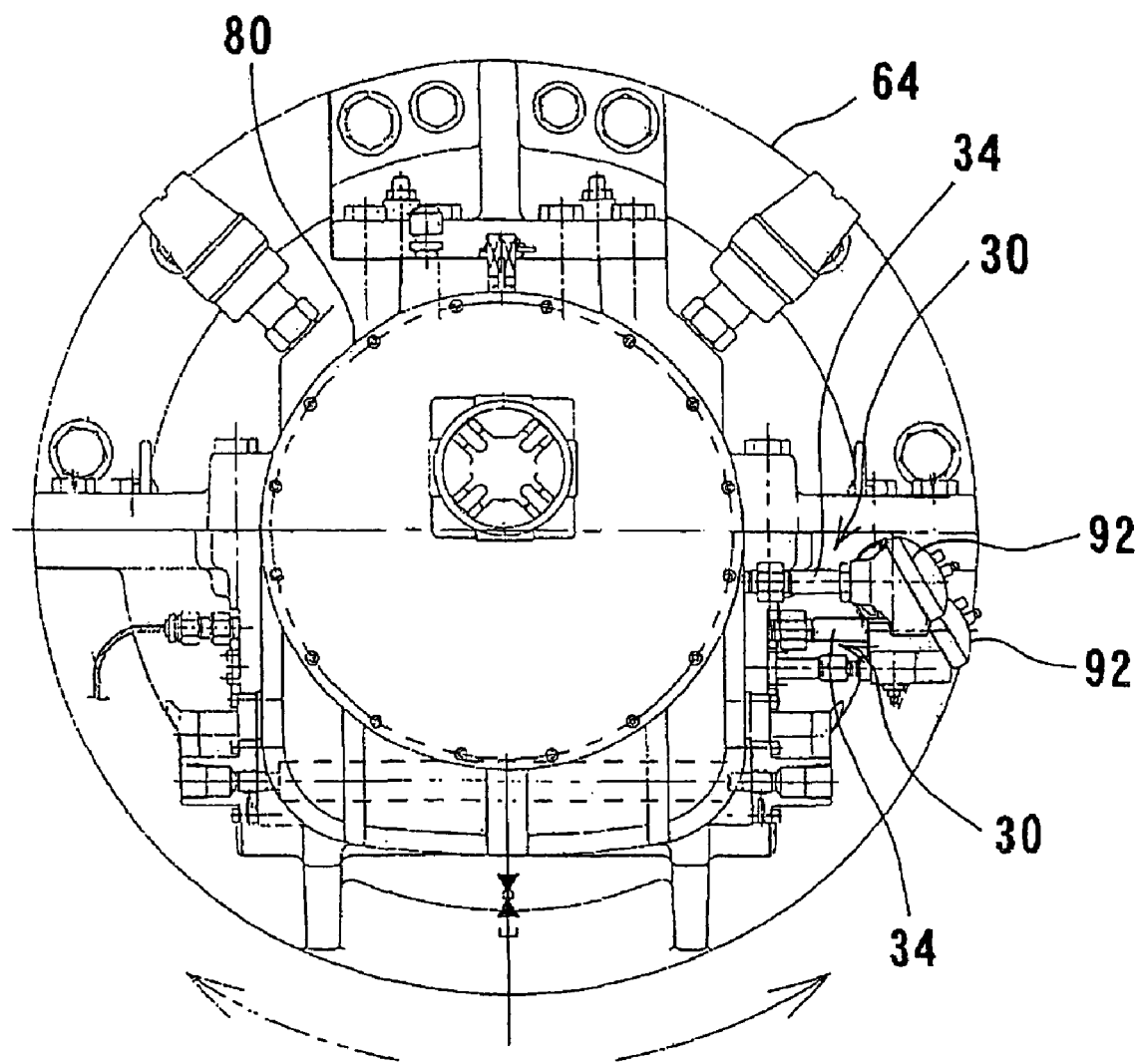
FIG. 4 is a left side view of the pump apparatus shown in FIG. 3 which incorporates the sheath type measuring instruments shown in FIG. 1 mounted therein.
Figure 5:
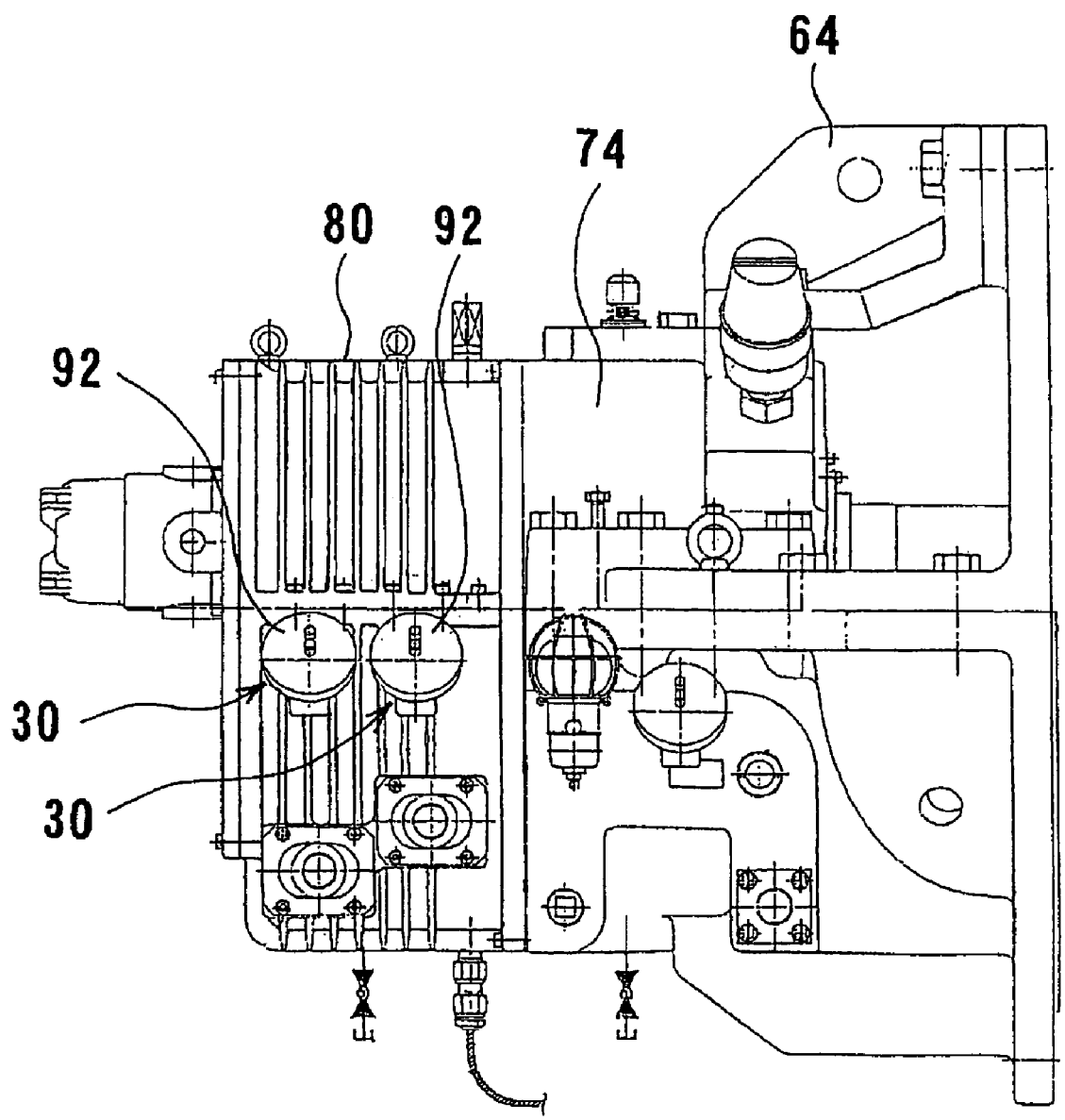
FIG. 5 is a front view of a bearing cover housing therein a thrust bearing of the pump apparatus shown in FIG. 3 which incorporates the sheath type measuring instruments shown in FIG. 1 mounted therein.

FIGS. 3 through 6 show an example in which sheath type measuring instruments 30 shown in FIG. 1 are mounted in a double-suction-type pump apparatus 60 as a rotary machine. As shown in FIG. 3, the double-suction-type pump apparatus 60 (rotary machine) has a pump casing 64 with a volute chamber 62 defined therein. An impeller 68, which is rotatable in response to rotation of a main shaft 66, is disposed in the pump casing 64. The main shaft 66 is coupled to a drive shaft 72 of a motor or the like by a coupling 70. The main shaft 66 has opposite ends rotatably supported by journal bearings 76 as a pair of radial bearings disposed in respective bearing casings 74. A thrust bearing 78 for bearing a thrust load from the main shaft 66 is disposed on an outer side of one of the journal bearings 76 and integrally covered with a bearing cover (apparatus casing) 80.

Figure 6:
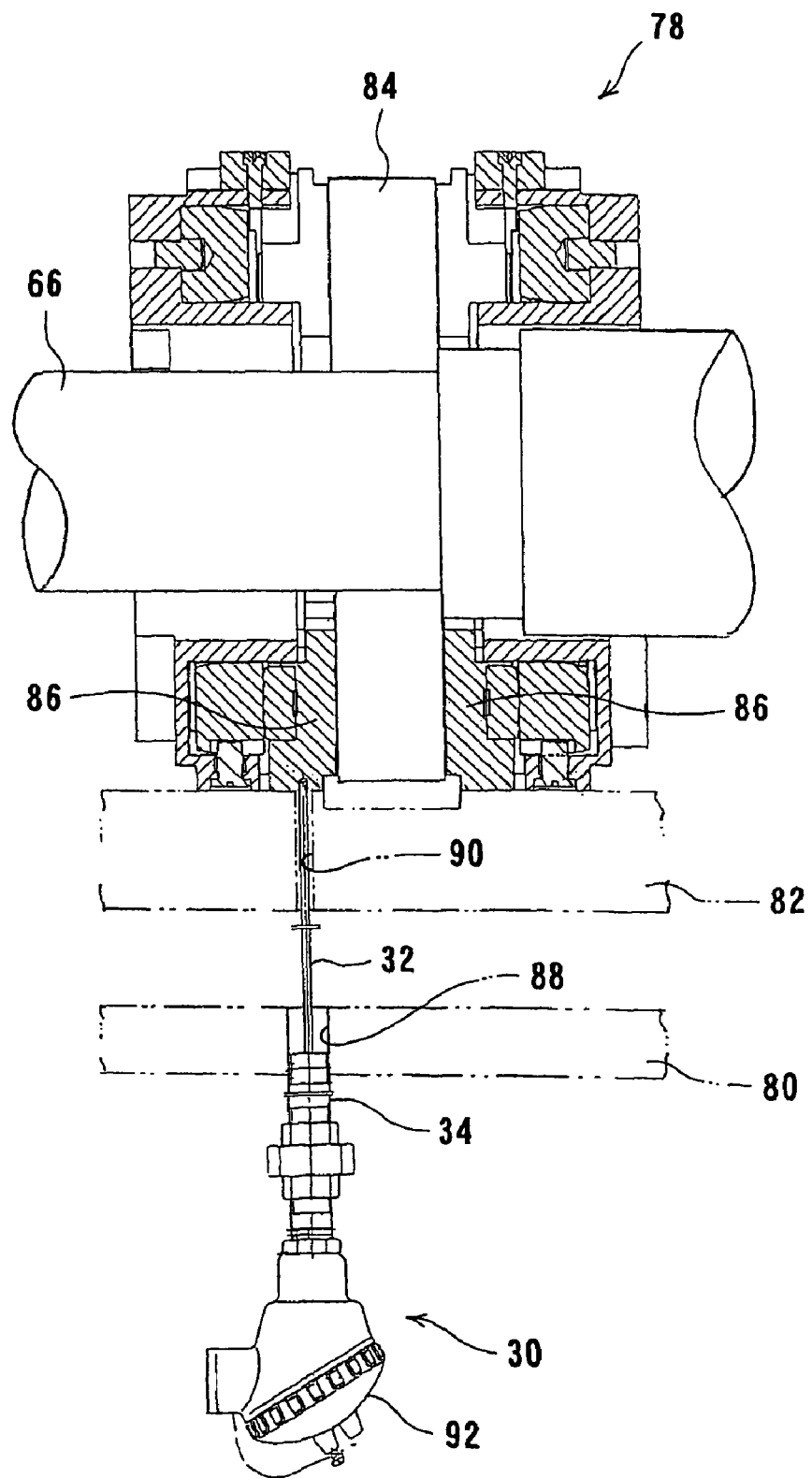
FIG. 6 is a diagram showing the relationship between the thrust bearing, the bearing cover, and the sheath type measuring instrument when the sheath type measuring instrument shown in FIG. 1 is mounted in the pump apparatus shown in FIG. 3.
Figure 7:
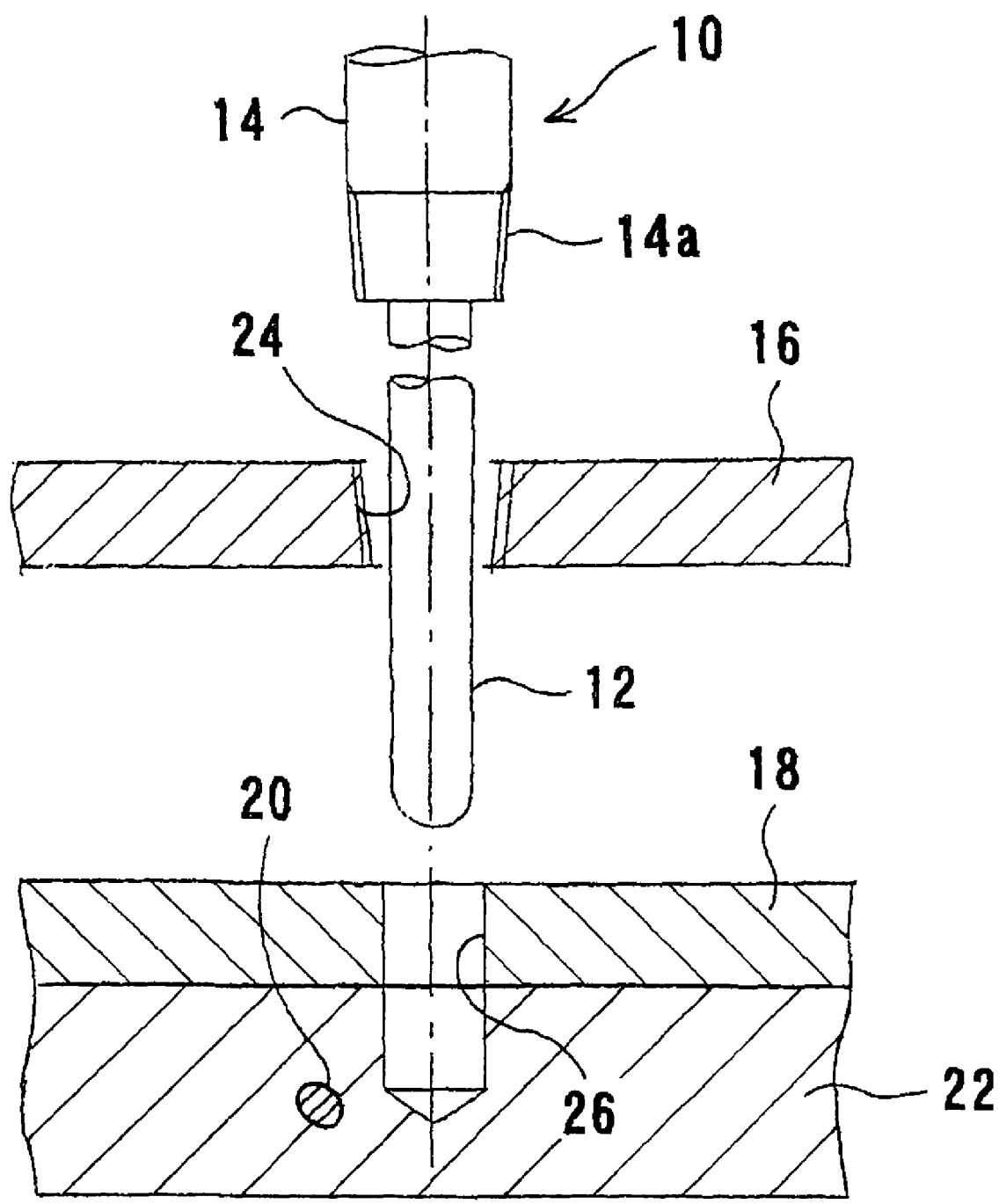
FIG. 7 is a view schematically showing a conventional sheath type measuring instrument, the view being illustrative of a scheme in which the conventional sheath type measuring instrument is mounted in place.
Figure 8:
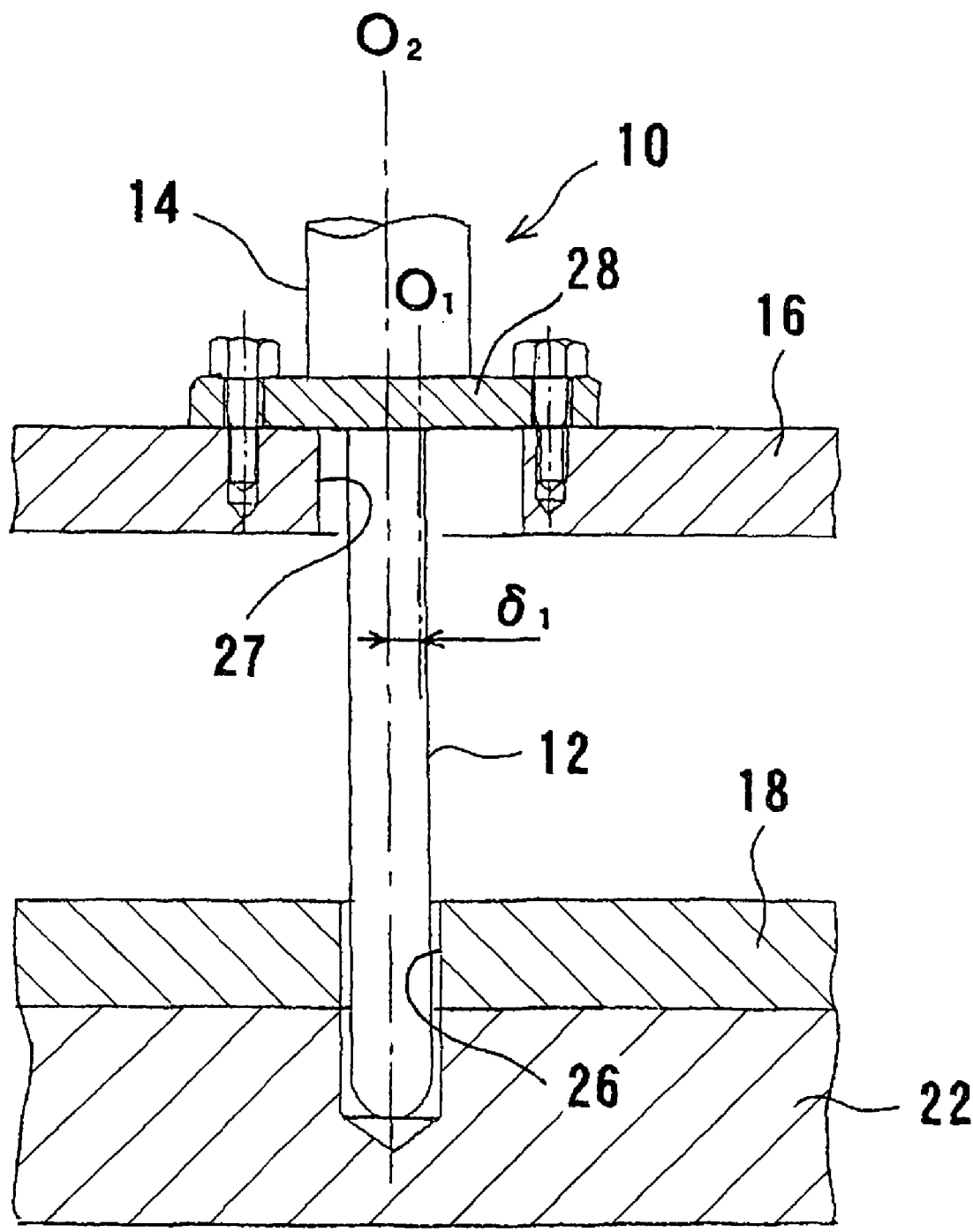
FIG. 8 is a view schematically showing the conventional sheath type measuring instrument, the view being illustrative of another scheme in which the conventional sheath type measuring instrument is mounted in place.

As shown in detail in FIG. 6, the thrust bearing 78 has a cylindrical bearing casing 82. Thrust pads 86 as sliding contact members are disposed respectively on opposite sides of a thrust collar 84 which serves as a rotor rotatable in unison with the main shaft 66 within the bearing casing 82, the thrust pads 86 being mounted in the casing 82. When the main shaft 66 rotates, the thrust collar (rotor) 84 rotates, and the thrust pads (sliding contact members) 86 are held in sliding contact with the opposite surfaces of the thrust collar 84 for bearing the thrust load from the main shaft 66.

In this embodiment, a plurality of (e.g., six) substantially sectorial thrust pads 86 are disposed on each of the opposite sides of the thrust collar 84 at circumferentially spaced equal intervals. Each of these thrust pads 86 is slightly movable axially. One of the thrust pads 86 positioned each of the opposite sides of the thrust collar 84 is measured for temperature by the sheath type measuring instrument 30. The temperatures of the thrust pads 86, which are held in sliding contact with the thrust collar 84 and heated and hence are exposed to high temperatures during operation of the pump apparatus, are monitored at all times, and changes in the temperatures of the thrust pads 86 are confirmed based on the monitored temperatures for thereby finding early a malfunction of the pump apparatus 60 during its operation. As the sheath type measuring instruments 30 each shown in FIG. 1 are used to measure the temperatures of the thrust pads 86, there is less danger of disconnection than if a thermocouple or a thermoresistor is directly wired to the thrust pads or the like, and the sheath type measuring instruments 30 can be mounted in place with better efficiency.

Specifically, as shown in FIG. 6, a barrel mount hole 88 is bored in the bearing cover (apparatus casing) 80 and a sheath insertion hole 90 is bored in the bearing casing 82 and the thrust pad (sliding contact member) 86 in alignment with the barrel mount hole 88. The tip end of the sheath 82 is located in position in the sheath insertion hole 90, and the barrel 34 of the sheath type measuring instrument 30 is threaded into the barrel mount hole 88 bored in the bearing cover 80, thereby mounting the sheath type measuring instrument 30 in place. In this embodiment, a terminal box 92 having terminals is mounted on the head of the barrel 34.

Even if there is a positional deviation occurring between the center of the barrel mount hole 88 and the center of the sheath insertion hole 90, in the same manner as described above, the sheath 32 is translated in a direction perpendicular to the axis thereof by a distance that is commensurate with the positional deviation, so that the positional deviation can be absorbed easily with the sheath type measuring instrument 30 itself. Accordingly, even if the bearing cover 80 and the bearing casing 82 are bored without the need for high positional accuracy, the sheath type measuring instrument 30 can be mounted in place while the sheath 32 is being positioned in place. As there is no need for concern over a positional deviation of the holes when the parts are assembled, the assembling efficiency is increased and the time required to assemble the parts is greatly reduced.

In this embodiment, the double-suction-type pump apparatus has been used as a rotary machine. However, the present invention is also applicable to any of other pump apparatus or rotary machines other than pump apparatus.

With the sheath type measuring instrument according to the present invention, even if there is a positional deviation occurring between the barrel mount hole bored in the outer wall and the sheath insertion hole bored in the inner wall, the positional deviation can be absorbed easily with the sheath type measuring instrument itself. Accordingly, even if the outer wall and the inner wall are bored without the need for high positional accuracy, the sheath type measuring instrument can be mounted in place while the sheath is being positioned in place. As there is no need for concern over a positional deviation of the holes when the parts are assembled, the assembling efficiency is increased and the time required to assemble the parts is greatly reduced.

With the bearing according to the present invention, the temperature of a sliding member exposed to high temperatures, such as a thrust pad of a thrust bearing or the like, for example, can be monitored at all times by the sheath type measuring instrument.

With the rotary machine according to the present invention, the temperature of a sliding member of a bearing, which is exposed to high temperatures, can be monitored at all times, and can be prevented from increasing thereby to prevent a rotary machine such as a pump or the like from being lowered in performance.

What is claimed is:

1. A sheath type measuring instrument comprising:
    a barrel;
    a sheath having a tip end for being brought closely to or into contact with a measurand for measuring a physical property of the measurand;
    a first socket, disposed in said barrel, holding a proximal portion of said sheath;
    a second socket fitted in said barrel slidably, and
    a flexible coupling having a first end fixed to said first socket and a second end fixed to said second socket, wherein a space within said barrel surrounding said first socket and said flexible coupling permits said first socket and said sheath to move in a direction perpendicular to an axis of said sheath.

2. A sheath type measuring instrument according to claim 1, further comprising:
a spring disposed in said barrel between one end of said barrel and said first socket.

3. A sheath type measuring instrument according to claim 1, further comprising:
an O-ring disposed between said second socket and said barrel.

* * * * *